US009081261B2

(12) United States Patent
Miyakawa et al.

(10) Patent No.: US 9,081,261 B2
(45) Date of Patent: Jul. 14, 2015

(54) ILLUMINATION APPARATUS, IMAGING APPARATUS, CAMERA SYSTEM, AND CONTROL METHOD

(71) Applicant: CANON KABUSHIKI KAISHA, Tokyo (JP)

(72) Inventors: Toshiki Miyakawa, Yokohama (JP); Yuji Yamamoto, Kasukabe (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/311,735

(22) Filed: Jun. 23, 2014

(65) Prior Publication Data
US 2014/0376901 A1 Dec. 25, 2014

(30) Foreign Application Priority Data

Jun. 24, 2013 (JP) .................................. 2013-131673

(51) Int. Cl.
*G03B 15/06* (2006.01)
*G03B 15/05* (2006.01)
(52) U.S. Cl.
CPC ...................................... *G03B 15/05* (2013.01)
(58) Field of Classification Search
USPC ........................... 396/174, 205; 348/370–371
See application file for complete search history.

(56) References Cited

U.S. PATENT DOCUMENTS 8,160,435 B2 * 4/2012 Okubo ............................ 396/56
2009/0092387 A1 * 4/2009 Voigt ............................ 396/205

FOREIGN PATENT DOCUMENTS

JP         4-340527 A    11/1992
JP     2011-221364 A    11/2011

* cited by examiner

*Primary Examiner* — Clayton E LaBalle
*Assistant Examiner* — Minh Phan
(74) *Attorney, Agent, or Firm* — Canon USA, Inc., IP Division

(57) ABSTRACT

An illumination apparatus includes a main body, a movable unit, a first driving unit, a second driving unit, and a control unit. The movable unit is rotatable with respect to the main body and includes a light emitting unit and an optical member disposed in front of the light emitting unit to refract incident light. The first driving unit rotates the movable unit with respect to the main body. The second driving unit moves at least one of the light emitting unit and the optical member to change relative positions. Power is supplied to the second driving unit from a power source that supplies power to the first driving unit. The control unit controls a rotation operation performed using the first driving unit and a moving operation performed using the second driving unit so that the rotation operation is performed after the moving operation is performed.

14 Claims, 5 Drawing Sheets

ILLUMINATION APPARATUS, IMAGING APPARATUS, CAMERA SYSTEM, AND CONTROL METHOD

BACKGROUND OF THE INVENTION

1. Field of the Invention

The present invention relates to drive control for changing illumination characteristics of an illumination apparatus.

2. Description of the Related Art

Conventionally, flash shooting (hereinafter, "bounce flash shooting") is known in which light is emitted from an illumination apparatus toward a ceiling or the like to illuminate a subject with diffuse-reflected light from the ceiling or the like. In the bounce flash shooting, a subject can be illuminated indirectly, not directly, with light from an illumination apparatus. This enables imaging with soft light.

Further, there has been proposed a technique for automatically determining an optimum illumination direction in bounce flash shooting. Japanese Patent Application Laid-Open No. 4-340527 discusses a technique for automatically setting the angle of a flash light emitting unit at the time of emitting a flash toward a ceiling in bounce flash shooting based on information about the distance to an object located above a camera and the distance to a subject.

Further, there has been conventionally known an illumination apparatus capable of changing an illumination range so that the illumination range required according to the focal length of an imaging apparatus can be illuminated with light.

If the mechanism for changing the illumination range of a flash light emitting unit is applied to the camera discussed in Japanese Patent Application Laid-Open No. 4-340527, the following issue arises.

In the camera discussed in Japanese Patent Application Laid-Open No. 4-340527, if power is supplied to the mechanism for changing the illumination range of the flash light emitting unit while power is supplied to a stepping motor (M1) to change the angle of the flash light emitting unit, a large amount of power is needed. Thus, depending on the state of a power source, the supply of power may become insufficient, and an operation to change the angle of the flash light emitting unit and an operation to change the illumination range of the flash light emitting unit may not be executed normally. As a result, an appropriate angle and illumination range may not be obtained.

SUMMARY OF THE INVENTION

The present invention is directed to an illumination apparatus capable of changing each of an illumination direction and an illumination range as appropriate.

According to an aspect of the present invention, an illumination apparatus includes a main body, a movable unit configured to be rotatable with respect to the main body, the movable unit including a light emitting unit and an optical member disposed in front of the light emitting unit to refract incident light, a first driving unit configured to rotate the movable unit with respect to the main body, a second driving unit configured to move at least one of the light emitting unit and the optical member to change relative positions of the light emitting unit and the optical member, wherein power is supplied to the second driving unit from a power source that supplies power to the first driving unit, and a control unit configured to control a rotation operation performed using the first driving unit and a moving operation performed using the second driving unit, wherein the control unit performs control so that the rotation operation is performed after the moving operation is performed.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
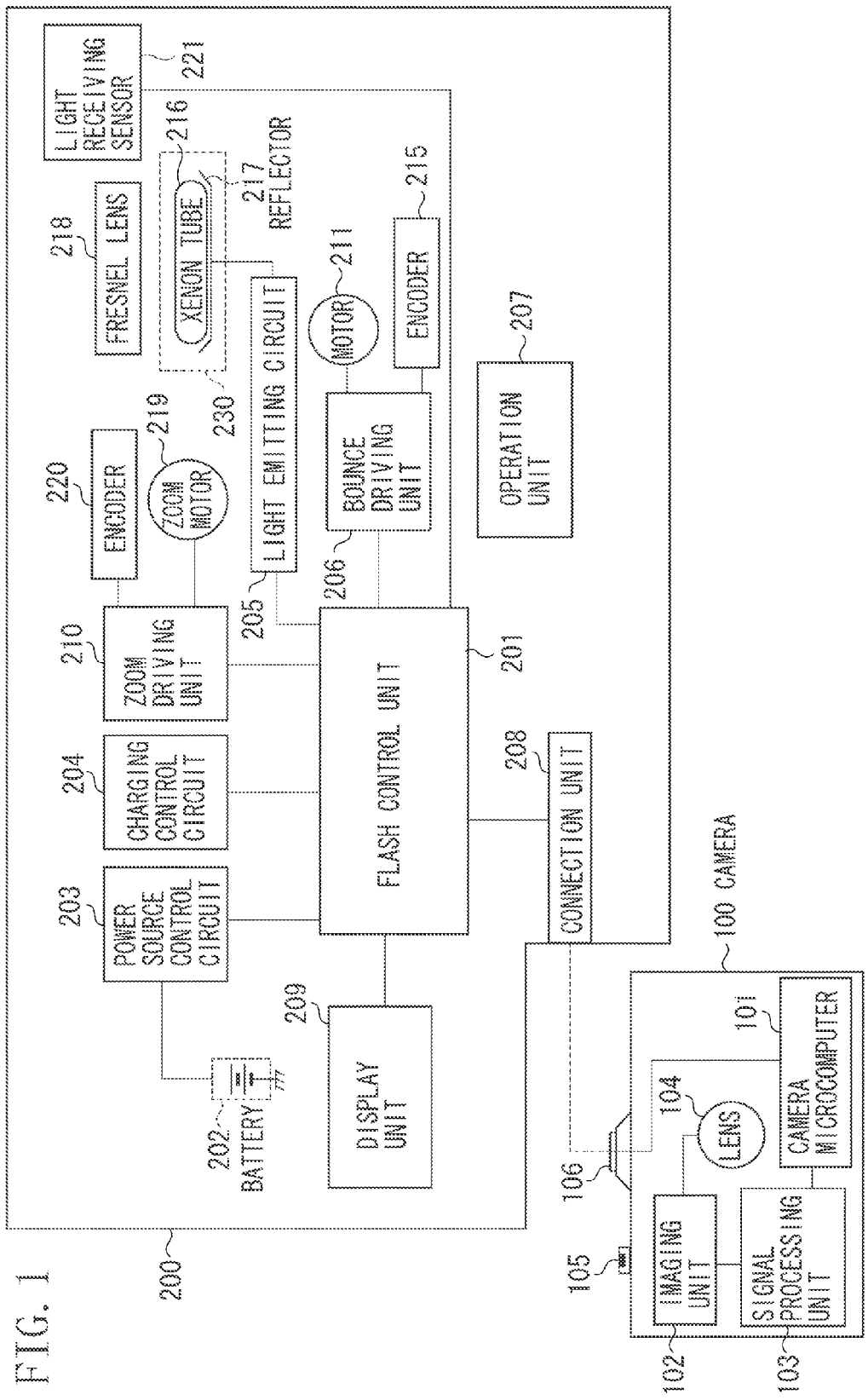
FIG. 1 illustrates a schematic configuration of a camera system according to an exemplary embodiment of the present invention.

The following describes a camera system according to an exemplary embodiment, with reference to FIG. 1. FIG. 1 is a block diagram illustrating a schematic configuration of the camera system according to the present exemplary embodiment.

As illustrated in FIG. 1, the camera system according to the present exemplary embodiment includes a camera 100 and a flash 200. The camera 100 is an imaging apparatus. The flash 200 is an illumination apparatus that is removably attached to the camera 100. The following describes the configuration of the camera 100.

A microcomputer (hereinafter "camera microcomputer") 101 includes a central processing unit (CPU), a read-only memory (ROM), a random access memory (RAM), and the like, and controls the entire operation of the camera 100. An imaging unit 102 includes an image sensor, such as a charge-coupled device (CCD) sensor or complementary metal-oxide semiconductor (CMOS) sensor, which includes an infrared cut filter, low-pass filter, or the like. The imaging unit 102 outputs image signals according to light fluxes having entered via a lens 104. A signal processing unit 103 performs various types of signal processing on the image signals input from the imaging unit 102. The lens 104 forms an image of a subject on the image sensor of the imaging unit 102, and a zoom lens is moved in an imaging optical axis direction to change a focal length.

An operation unit 105 includes a release button, a zoom lever, and the like. The release button is for issuing a command to start imaging preparation operations such as focal point adjustment and light metering, and a command to start an imaging operation. The zoom lever is for moving the zoom lens of the lens 104 to change the focal length.

A connection unit 106 includes an attachment portion, a contact portion, and the like. The attachment portion is for attaching an accessory such as an illumination apparatus. The contact portion is for communicating information with an attached accessory.

Figure 2:
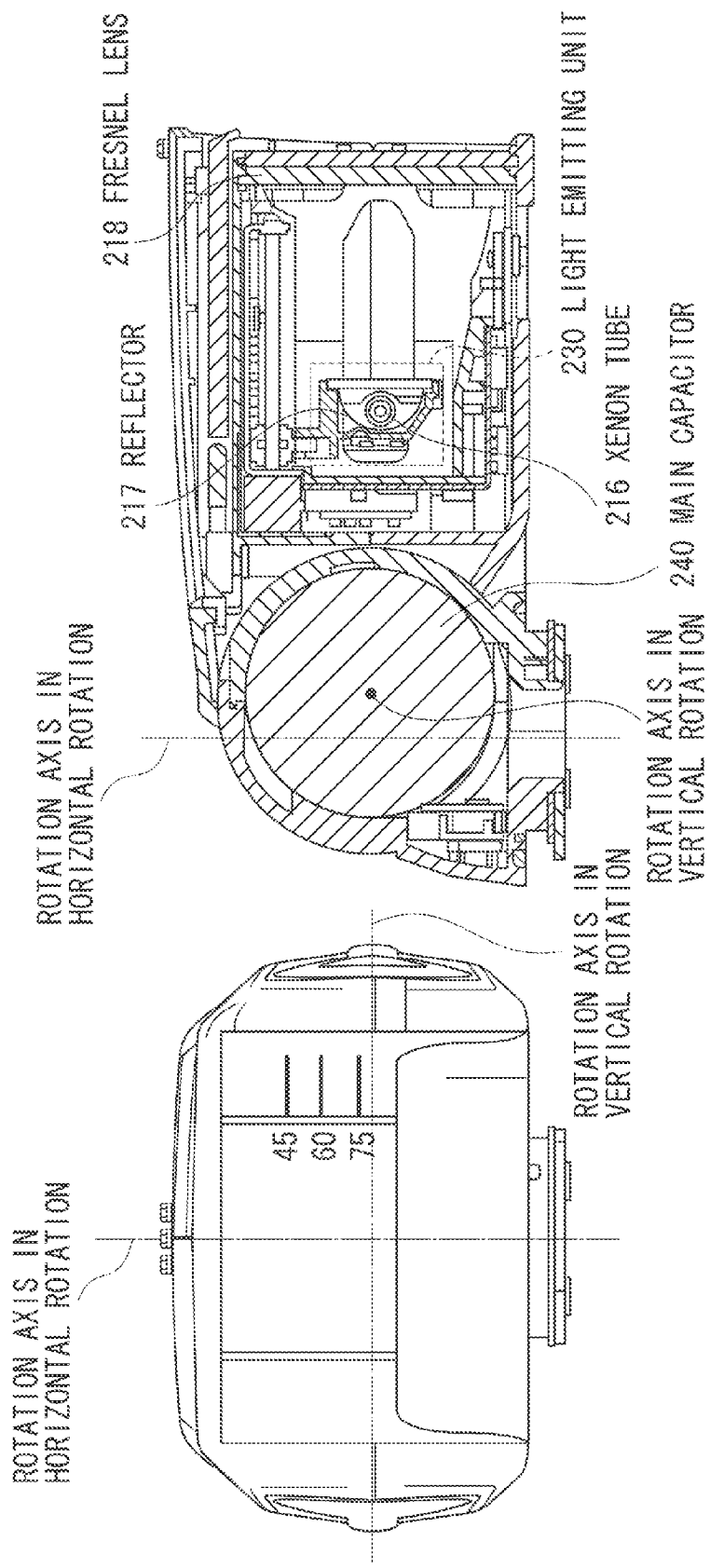
FIGS. 2A and 2B each illustrate only a portion around a movable unit of a flash.
Figure 3:
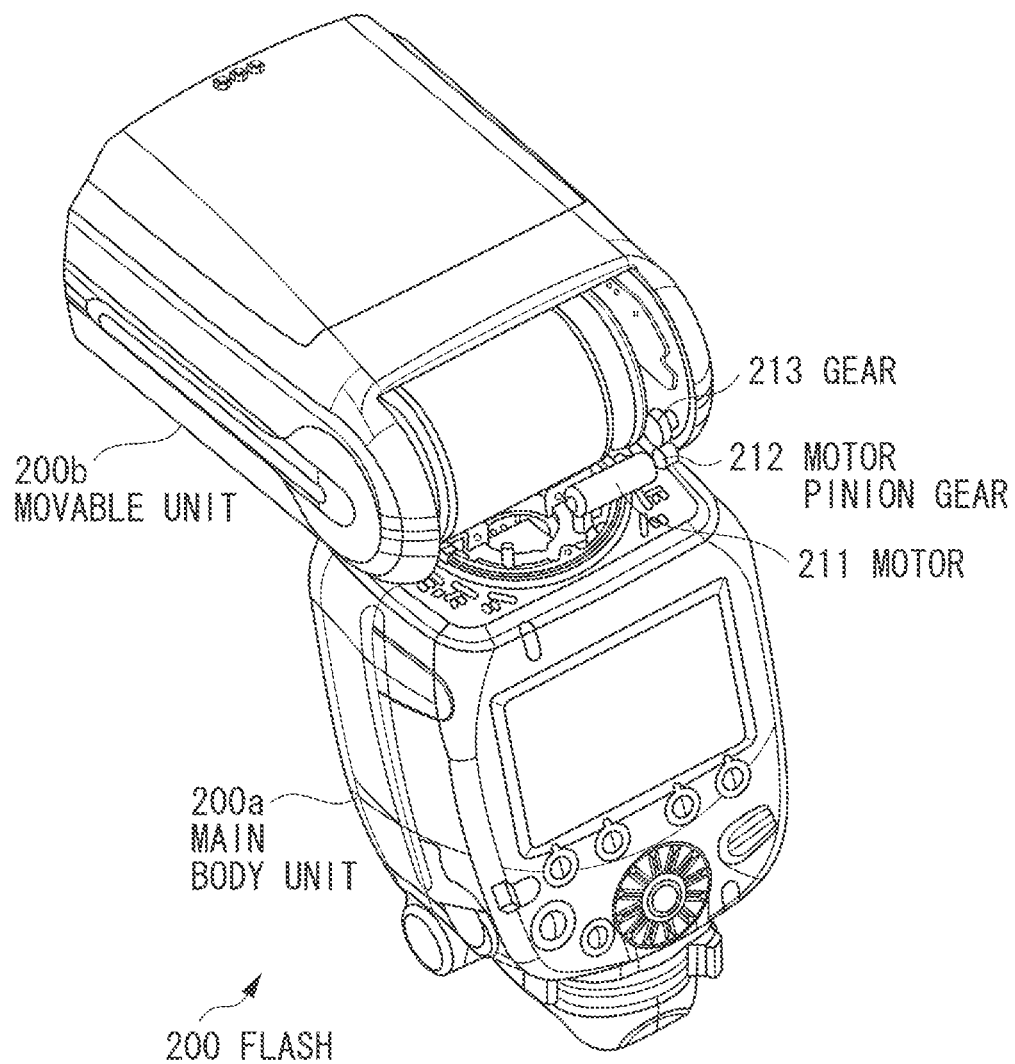
FIG. 3 illustrates the flash in a state in which the movable unit is positioned at a reference position, viewed in an illumination direction from a rotation axis side around which the movable unit is to be rotated.

The following describes a configuration of the flash 200, with reference to FIGS. 1, 2A, 2B, and 3. FIGS. 2A and 2B each illustrate only a portion around a movable unit 200b held rotatably with respect to a main body unit 200a. FIG. 3 illustrates the flash 200 in a state in which the movable unit 200b is positioned at a reference position, viewed in an illumination direction from a rotation axis side around which the movable unit 200b is to be rotated. In other words, FIG. 3 illustrates the flash 200 viewed from its rear surface side when the movable unit 200b is positioned at the reference position and a surface that faces the same direction as a Fresnel lens 218 is a front surface of the main body unit 200a. In the present exemplary embodiment, a side of the main body unit 200a that is connected to the movable unit 200b is defined as an upper side to define vertical and horizontal directions of driving of the movable unit 200b with respect to the main body unit 200a. In FIG. 3, illustration of a part of an exterior is omitted to make it easy to see the mechanism for vertically rotating the movable unit 200b with respect to the main body unit 200a.

A flash control unit 201 includes a CPU, ROM, RAM, and the like. The flash control unit 201 controls the entire operation of the flash 200. A battery 202 is a power source such as a built-in battery and an external battery. A power source control circuit 203 controls the supply of power from the battery 202 to each unit of the flash 200 according to a command from the flash control unit 201.

A charging control circuit 204 boosts the voltage of the battery 202 to several hundred volts to charge a main capacitor 240 with electrical energy. A light emitting circuit 205 controls emission of light from a light emitting unit 230. When emission of light is started, the light emitting circuit 205 applies a trigger voltage of several kilovolts to a xenon tube 216 included in the light emitting unit 230 as a light source. When the trigger voltage is applied to the xenon tube 216, the xenon tube 216 is excited to emit light using the electrical energy charged in the main capacitor 240.

A bounce driving unit 206 drives (rotates) the movable unit 200b vertically and horizontally with respect to the main body unit 200a according to a command from the flash control unit 201. In FIG. 3, a motor 211, a motor pinion gear 212, and a gear 213 are illustrated as an example of the mechanism for driving (rotating) the movable unit 200b vertically with respect to the main body unit 200a. The motor 211, the motor pinion gear 212, and the gear 213 are included in the bounce driving unit 206. The bounce driving unit 206 controls the motor 211 according to a command from the flash control unit 201 and transmits rotations of the motor pinion gear 212, which is firmly attached to a driving shaft of the motor 211, to an internal gear (not illustrated) via the gear 213 to rotate the movable unit 200b vertically.

The movable unit 200b can be driven (rotated) horizontally with respect to the main body unit 200a by a mechanism that is similar to the mechanism illustrated in FIG. 3. Thus, the description of a mechanism for driving (rotating) the movable unit 200b horizontally with respect to the main body unit 200a is omitted.

The mechanisms for driving (rotating) the movable unit 200b vertically and horizontally with respect to the main body unit 200a are not limited to the example described above, and any mechanism for driving using electrical power can be used such as a mechanism in which a single motor is used to drive the movable unit 200b vertically and horizontally.

The bounce driving unit 206 acquires via an encoder 215 driving information indicating the amount of driving, the rotation angle, or the like of the movable unit 200b from the reference position.

An operation unit 207 includes an automatic bounce switch, a setting switch, and the like. The automatic bounce switch is for switching to start or stop execution of auto bounce. The setting switch is for setting the illumination range of the light emitting unit 230. The operation unit 207 further includes an automatic determination switch for starting an operation to automatically determine the illumination direction in bounce flash shooting (hereinafter, the operation will be referred to as an "auto bounce operation"). When the automatic determination switch is operated, the flash control unit 201 outputs commands to the charging control circuit 204, the bounce driving unit 206, and a zoom driving unit 210 for performing various processes to execute the auto bounce operation.

A connection unit 208 includes an attachment portion, a contact portion, and the like. The attachment portion is for attaching the flash 200 to an imaging apparatus. The contact portion includes a contact point of communication with an imaging apparatus. The flash control unit 201 communicates information with an attached imaging apparatus via the contact portion of the connection unit 208.

A display unit 209 displays images using liquid crystal, organic electroluminescence (EL), or the like. The display unit 209 displays a menu screen or the like for configuring various settings of the flash 200, or a menu screen for changing the various settings.

The zoom driving unit 210 controls a zoom motor 219 according to a command from the flash control unit 201, and moves the light emitting unit 230 to change relative positions of the light emitting unit 230 and the Fresnel lens 218 disposed in front (in the illumination direction) of the light emitting unit 230. Further, the zoom driving unit 210 acquires via an encoder 220 positional information indicating the relative positions of the light emitting unit 230 and the Fresnel lens 218. The flash control unit 201 acquires information about the focal length of the camera 100 from the camera 100 via the connection unit 208 and outputs a command to the zoom driving unit 210 so that the illumination range is adjusted to be an optimum illumination range according to the acquired information about the focal length. Further, the flash control unit 201 outputs a command to the zoom driving unit 210 so that the illumination range is adjusted to be an illumination range being set through the operation of the operation unit 207.

A light receiving sensor 221 receives reflected light from a reflecting object that exists in the illumination direction of the light emitting unit 230 when the light emitting unit 230 emits light. The light receiving sensor 221 then outputs a received light result to the flash control unit 201. Based on the received light result output from the light receiving sensor 221, the flash control unit 201 calculates distance to the reflecting object that exists in the illumination direction to obtain distance information. Further, the flash control unit 201 determines an optimum illumination direction in bounce flash shooting based on the received light result in a case where the light emitting unit 230 emits light in an illumination direction directed toward the imaging direction of the camera 100, and the received light result in a case where the light emitting unit 230 emits light in an illumination direction directed toward the ceiling direction.

The light emitting unit 230 includes the xenon tube 216 and a reflector 217. The xenon tube 216 is a light source. The reflector 217 reflects in the direction of the Fresnel lens 218 the light fluxes emitted from the xenon tube 216. The Fresnel lens 218 is an optical member in which a prism having a function of refracting incident light fluxes is formed.

FIGS. 2A and 2B each illustrate only a portion around the movable unit 200b. FIG. 2A illustrates the light emitting unit 230 in a state in which the movable unit 200b is positioned at the reference position, viewed in the illumination direction from the rotation axis side around which the movable unit 200b is to be rotated. FIG. 2B is a cross sectional view that is orthogonal to the rotation axis around which the movable unit 200b is to be rotated vertically with respect to the main body unit 200a. FIG. 2B illustrates a state in which the light emitting unit 230 is moved to a position at which the relative positions of the light emitting unit 230 and the Fresnel lens 218 indicate the greatest distance from each other within a movable range (a telephoto end side).

In the state illustrated in FIG. 2B, the light fluxes emitted from the light emitting unit 230 are converged to a smallest spot, resulting in a narrowest illumination range. This is effective in a case where the focal length of the camera 100 is long, or in a case where the light fluxes emitted from the light emitting unit 230 is expected to be efficiently delivered to a far place. In the states illustrated in FIGS. 2A and 2B, the light emitting unit 230 is at the closest position within a movable range to the rotation axis around which the movable unit 200b is to be rotated vertically with respect to the main body unit 200a and to the rotation axis around which the movable unit 200b is to be rotated horizontally with respect to the main body unit 200a. This can reduce the moment generated when the movable unit 200b is rotated vertically or horizontally with respect to the main body unit 200a.

According to the present exemplary embodiment, when the movable unit 200b is to be automatically rotated vertically or horizontally with respect to the main body unit 200a, the light emitting unit 230 is thus moved closer to the rotation axis of the movable unit 200b, and then the movable unit 200b is rotated. This can reduce damage to the connection unit 106 of the camera 100 and the connection unit 208 of the flash 200 that is caused by looseness between the connection unit 106 and the connection unit 208 when the movable unit 200b is automatically rotated with respect to the main body unit 200a. Furthermore, since the moment generated at the time of rotation is reduced, the driving load at the time of rotating the movable unit 200b can be reduced.

Further, according to the present exemplary embodiment, when the light emitting unit 230 is to emit light to determine the optimum illumination direction in bounce flash shooting, the light emitting unit 230 is moved closer to the rotation axis of the movable unit 200b and then emits light. As described above, the closer the light emitting unit 230 is to the rotation axis of the movable unit 200b, the more converged the light fluxes emitted from the light emitting unit 230 is, resulting in a narrower illumination range. Thus, even in the same scene, as the light emitting unit 230 is moved closer to the rotation axis of the movable unit 200b, the amount of reflected light of the light emitted from the light emitting unit 230 increases to increase the accuracy of the optimum illumination direction that is determined based on the received light result output from the light receiving sensor 221.

Figure 4:
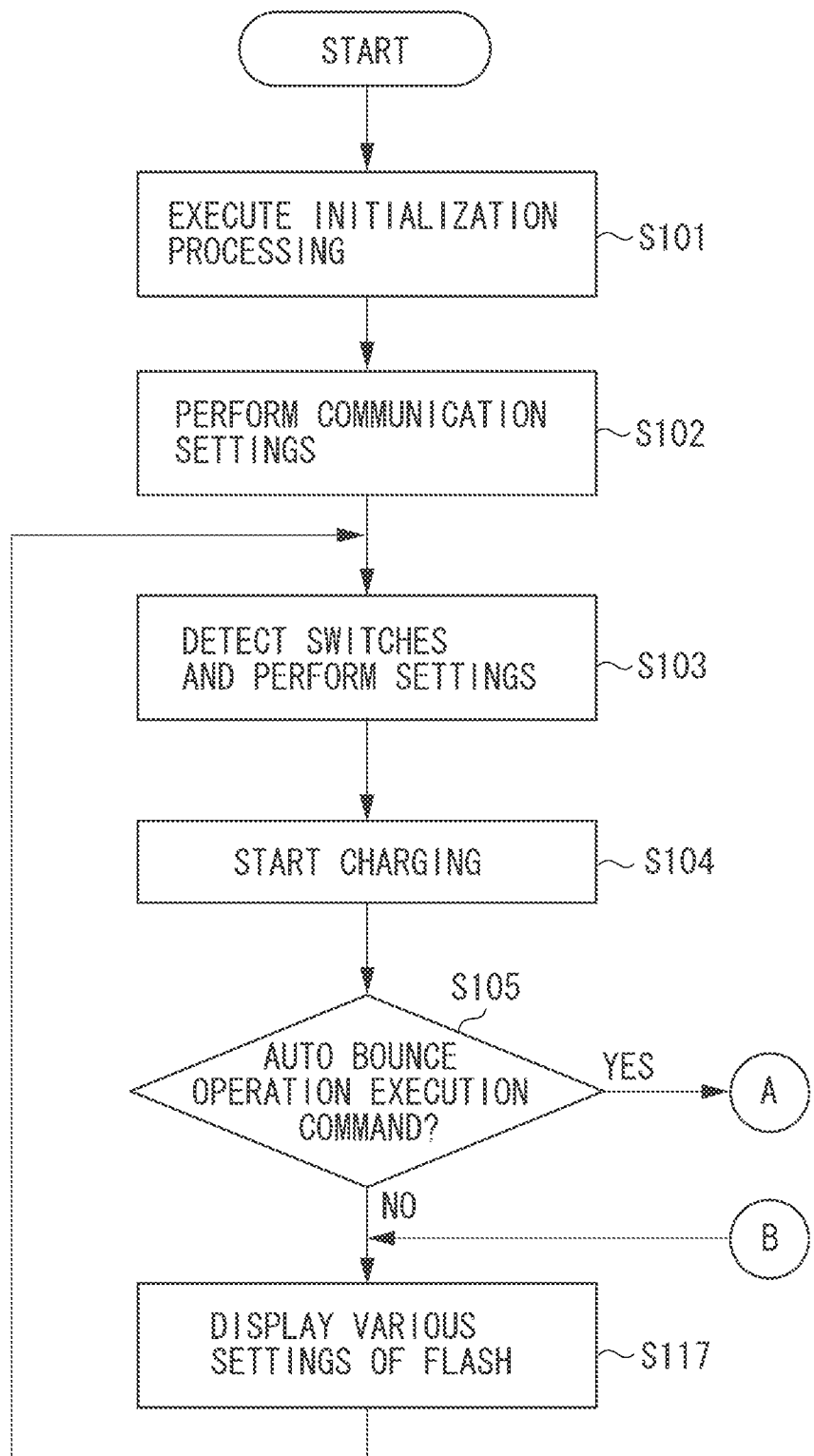
FIG. 4 is a flow chart illustrating entire processing performed by the flash, including processing performed in bounce flash shooting.
Figure 5:
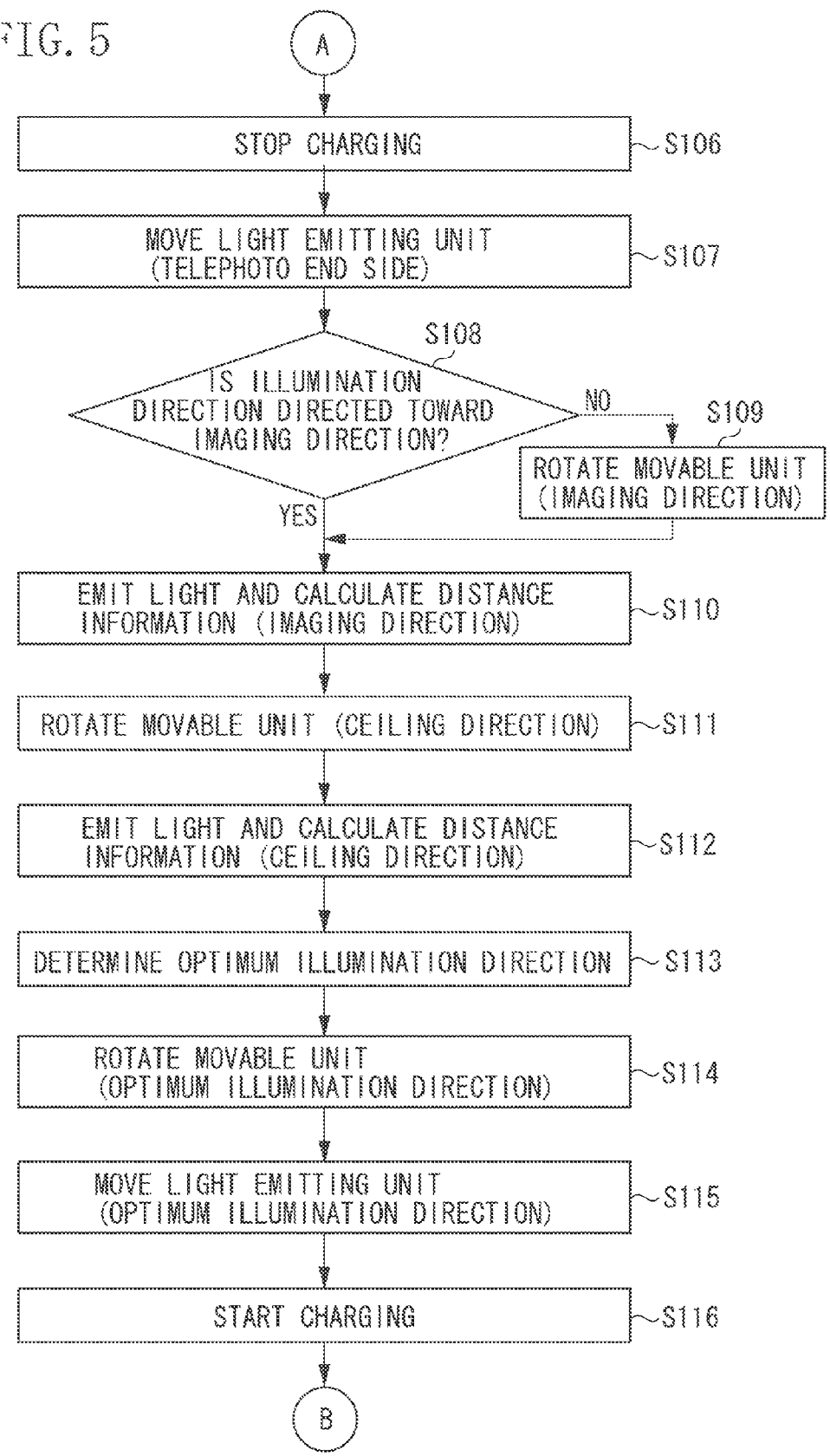
FIG. 5 is a flow chart illustrating entire processing performed by the flash, including processing performed in bounce flash shooting.

The following describes various types of processing relating to an auto bounce operation and being performed by the flash 200, with reference to FIGS. 4 and 5. FIGS. 4 and 5 are flow charts illustrating entire processing performed by the flash 200, including processing performed in bounce flash shooting.

When the power of the flash 200 is turned on, in step S101, the flash control unit 201 is activated to execute initialization processing on each unit, read external electrically erasable programmable read-only memory (EEPROM) data, and execute data initialization of an internal RAM and the like.

In step S102, the flash control unit 201 performs communication setting to communicate information with the attached camera 100. In step S103, the flash control unit 201 detects operations performed on various switches included in the operation unit 207 and performs setting according to the detection results.

In step S104, the flash control unit 201 commands the charging control circuit 204 to start charging the main capacitor 240. The charging control circuit 204 checks the charged voltage of the main capacitor 240 during execution of processing in subsequent steps, and stops charging when the charged voltage reaches a predetermined value. Further, when the processing proceeds to step S104, if the charged voltage is equal to or higher than the predetermined value, the charging control circuit 204 determines that no further charging is necessary and omits step S104.

In step S105, the flash control unit 201 determines whether there is an auto bounce operation execution command. The auto bounce operation execution command may be generated in response to the automatic determination switch of the operation unit 207 being operated or may be sent from the attached camera 100. If there is an auto bounce operation execution command (YES in step S105), the processing proceeds to step S106 in FIG. 5. In step S106, the flash control unit 201 commands the charging control circuit 204 to stop charging the main capacitor 240. If the charging control circuit 204 has already stopped charging the main capacitor 240, no processing is performed, and the processing proceeds to the subsequent step, i.e., step S107.

In step S107, the flash control unit 201 commands the zoom driving unit 210 to move the light emitting unit 230 to a position at which the relative positions of the light emitting unit 230 and the Fresnel lens 218 indicate the greatest distance from each other within a movable range. This is to reduce the moment generated when the movable unit 200b is rotated, as described above. Thus, the light emitting unit 230 does not have to be moved to a position at which the relative positions of the light emitting unit 230 and the Fresnel lens 218 indicate the greatest distance from each other (the state in which the light emitting unit 230 is at the closest position to the rotation axis). In other words, if the light emitting unit 230 is moved to a position at which the relative positions of the light emitting unit 230 and the Fresnel lens 218 indicate a greater distance from each other than that at the current position (if the light emitting unit 230 is moved closer to the rotation axis), more moment can be reduced compared with that reduced at the current position.

In step S108, the flash control unit 201 determines whether the illumination direction of the light emitting unit 230 is directed toward the imaging direction of the camera 100. When the flash 200 is attached to the camera 100, the reference position of the movable unit 200b is the position at which the illumination direction of the light emitting unit 230 is directed toward the imaging direction of the camera 100. Hence, the flash control unit 201 determines whether the movable unit 200b is positioned at the reference position based on the driving information output from the encoder 215.

If the illumination direction of the light emitting unit 230 is directed toward the imaging direction of the camera 100 (if the movable unit 200b is positioned at the reference position) (YES in step S108), the processing proceeds to step S110. On the other hand, if the illumination direction of the light emitting unit 230 is not directed toward the imaging direction (if the movable unit 200b is not positioned at the reference position) (NO in step S108), the processing proceeds to step S109.

In step S109, the flash control unit 201 commands the bounce driving unit 206 to rotate the movable unit 200b so that the illumination direction of the light emitting unit 230 is directed toward the imaging direction of the camera 100.

In step S110, the flash control unit 201 commands the light emitting circuit 205 to cause the light emitting unit 230 to emit light. In addition, the flash control unit 201 calculates distance to the reflecting object that exists in the imaging direction to obtain distance information, based on the received light result output from the light receiving sensor 221 when the light emitting unit 230 emits the light.

In step S111, the flash control unit 201 commands the bounce driving unit 206 to rotate the movable unit 200b so that the illumination direction of the light emitting unit 230 is directed toward the ceiling direction. At this time, a typical use orientation of the camera 100 is such that the illumination direction of the light emitting unit 230 is directed toward the ceiling direction if the movable unit 200b is rotated by 90 degrees from the reference position toward an upper direction, so the flash control unit 201 can command the bounce driving unit 206 to rotate the movable unit 200b by 90 degrees from the reference position toward the upper direction. If the camera 100 or the flash 200 includes an orientation detection unit configured to detect anteroposterior and horizontal gradients with respect to the gravitational direction, such as an acceleration sensor, the illumination direction of the light emitting unit 230 can be directed toward the ceiling direction more accurately by use of the result of detection by the orientation detection unit.

In step S112, the flash control unit 201 commands the light emitting circuit 205 to cause the light emitting unit 230 to emit light. In addition, the flash control unit 201 calculates distance to the reflecting object that exists in the ceiling direction to obtain distance information, based on the received light result output from the light receiving sensor 221 when the light emitting unit 230 emits the light.

In step S113, the flash control unit 201 determines an optimum illumination direction in bounce flash shooting based on the distance information indicating the distance to the reflecting object existing in the imaging direction that is calculated in step S110, and the distance information indicating the distance to the reflecting object existing in the ceiling direction that is calculated in step S112.

As a method for determining the illumination direction, for example, there is a method in which the illumination direction is determined using the following Formula (1):

$$\theta = \tan^{-1}(2d/D) \quad (1)$$

where d denotes the distance to the reflecting object that exists in the ceiling direction, D denotes the distance to the reflecting object that exists in the imaging direction, and θ denotes the rotation angle from the reference position of the movable unit 200b at which an optimum illumination direction is achieved.

In step S114, the flash control unit 201 commands the bounce driving unit 206 to rotate the movable unit 200b so that the illumination direction of the light emitting unit 230 is directed toward the illumination direction determined in step S113.

In step S115, the flash control unit 201 commands the zoom driving unit 210 to move the light emitting unit 230 so that an optimum illumination range in bounce flash shooting is achieved. The position of the light emitting unit 230 at which the optimum illumination range in bounce flash shooting is achieved can be a position indicated by a designed value that is predetermined through experiments, simulations, or the like, or can be a position at which an illumination range being set through the operation of the operation unit 207 is achieved. Alternatively, because the closer the illumination direction determined in step S113 is to the imaging direction, the farther the reflecting object that is more likely to be used to reflect the light in bounce flash shooting is from the light emitting unit 230, the optimum illumination range can be changed according to the illumination direction determined in step S113. For example, the closer the illumination range determined in step S113 is to the imaging direction, the closer the light emitting unit 230 is moved to the rotation axis of the movable unit 200b. In step S107, the light emitting unit 230 is moved to the state in which the light emitting unit 230 is at the closest position to the rotation axis. Thus, if the position of the light emitting unit 230 at which the optimum illumination range is achieved is not the state in which the light emitting unit 230 is at the closest position to the rotation axis, the light emitting unit 230 is moved away from the rotation axis in step S115.

In step S116, the flash control unit 201 commands the charging control circuit 204 to start charging the main capacitor 240. The charging of the main capacitor 240 is started because the charged voltage has been decreased as a result of the emission of light from the light emitting unit 230 to determine the illumination direction of the light emitting unit 230. Step S116 can be omitted if the charging has been already completed prior to step S106 and the charged voltage is not smaller than the predetermined value even though the charged voltage has been decreased as a result of the emission of light to determine the illumination direction of the light emitting unit 230.

If the flash control unit 201 determines that there is no auto bounce operation execution command in step S105, or if a series of auto bounce operations is completed, the processing proceeds to step S117. In step S117, the flash control unit 201 commands the display unit 209 to display various settings of the flash 200. In a case where the series of auto bounce operations is completed, the display unit 209 displays information indicating the illumination direction determined through the auto bounce operation.

As the foregoing describes, according to the present exemplary embodiment, the driving to change the illumination direction indicating an illumination characteristic of the flash 200, and the driving to change the illumination range indicating an illumination characteristic of the flash 200 are not performed at the same time. In other words, the driving to change the illumination direction of the flash 200 and the driving to change the illumination range of the flash 200 are controlled so that when one of the driving to change the illumination direction and the driving to change the illumination range is performed, the other one of the driving to change the illumination direction and the driving to change the illumination range is not performed. Accordingly, when power is supplied to one of the driving source for changing the illumination direction of the flash 200 and the driving source for changing the illumination range of the flash 200, no power is supplied to the other one of the driving source for changing the illumination direction and the driving source for changing the illumination range, whereby each of the illumination direction and the illumination range of the illumination apparatus can be changed as appropriate.

Further, according to the present exemplary embodiment, when power is supplied to the driving source for changing the illumination direction of the flash 200 or the driving source for changing the illumination range of the flash 200, the charging of electrical energy for emission of light is not performed. This reduces the possibility of power supply insufficiency during the driving to change the illumination direction of the flash 200 or the driving to change the illumination range of the flash 200, so each of the illumination direction and the illumination range of the illumination apparatus can be changed as appropriate. Alternatively, when power is supplied to the driving source for changing the illumination direction of the flash 200 or the driving source for changing the illumination range of the flash 200, the charging of electrical energy for emission of light can be limited. For example, the charging of electrical energy for emission of light is performed using a lower electric current than a usual level. This can also reduce the possibility of power supply insufficiency during the driving to change the illumination direction or the driving to change the illumination range.

Instead of limiting the charging of electrical energy for emission of light, the driving for changing the illumination characteristics of the flash 200 (driving for changing the illumination direction or the illumination range) can be limited.

As to the method for determining an optimum illumination direction in bounce flash shooting, the method described in the above exemplary embodiment can be used in which an optimum illumination direction is determined based on the distance to the reflecting object that exists in the ceiling direction and the distance to the reflecting object that exists in the imaging direction. The present invention is also applicable to the case of, for example, using a method including causing the light emitting unit 230 to emit light in a plurality of illumination directions, conducting light metering in each of the illumination directions, and determining an optimum illumination direction based on the plurality of obtained light metering results, as discussed in Japanese Patent Application Laid-Open No. 2011-221364.

The present invention is also applicable to an illumination apparatus that does not have a function of determining an optimum illumination direction in bounce flash shooting as long as the illumination apparatus is configured to supply power to respective driving sources to change the illumination direction and the illumination range.

While the present exemplary embodiment describes the example case in which the present invention is applied to the illumination apparatus that is removably attached to the imaging apparatus, the present invention is also applicable to an illumination apparatus that is built in an imaging apparatus as long as the illumination apparatus is configured to supply power to respective driving sources to change the illumination direction and the illumination range. In this case, the camera microcomputer 101 can execute the various commands executed by the flash control unit 201.

In a camera system including an imaging apparatus and an illumination apparatus, the calculation processing, determination processing, various commands, and the like can be executed on either side. The camera microcomputer 101 can execute at least a part of the processing executed by the flash control unit 201 in the present exemplary embodiment.

To change the illumination range of the light emitting unit 230, the Fresnel lens 218 can be moved to change the relative positions of the light emitting unit 230 and the Fresnel lens 218, instead of moving the light emitting unit 230 to change the relative positions of the light emitting unit 230 and the Fresnel lens 218. Alternatively, both the light emitting unit 230 and the Fresnel lens 218 can be moved to change the relative positions of the light emitting unit 230 and the Fresnel lens 218. In other words, driving at least one of the light emitting unit 230 and the Fresnel lens 218 can change the illumination range of the light emitting unit 230. In a case where only the Fresnel lens 218 is to be moved, or in a case where both the light emitting unit 230 and the Fresnel lens 218 are to be moved, the light emitting unit 230 and the Fresnel lens 218 may be configured not to be moved when the movable unit 200b is rotated, as in the case described above in which only the light emitting unit 230 is to be moved.

Further, only some of the elements included in the light emitting unit 230 can be moved to change the illumination range of the light emitting unit 230. For example, only the reflector 217 may be moved to change the relative positions of the reflector 217 and the Fresnel lens 218 while the relative positions of the xenon tube 216 and the Fresnel lens 218 are not changed. In this case, it can be said that the light emitting unit 230 is moved to change the relative positions of the light emitting unit 230 and the Fresnel lens 218.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131673 filed Jun. 24, 2013, which is hereby incorporated by reference herein in its entirety.

What is claimed is:

1. An illumination apparatus comprising:
   a main body;
   a movable unit configured to be rotatable with respect to the main body, the movable unit including a light emitting unit and an optical member disposed in front of the light emitting unit to refract incident light;
   a first driving unit configured to rotate the movable unit with respect to the main body;
   a second driving unit configured to move at least one of the light emitting unit and the optical member to change relative positions of the light emitting unit and the optical member, wherein power is supplied to the second driving unit from a power source that supplies power to the first driving unit; and
   a control unit configured to control a rotation operation performed using the first driving unit and a moving operation performed using the second driving unit,
   wherein, in a case that the rotation operation and the moving operation are performed, the control unit performs control so that the rotation operation is performed after a first moving operation is performed to bring relative positions of the light emitting unit and the optical member to a first state and a second moving operation is performed to bring the relative positions of the light emitting unit and the optical member to a second state which is different from the first state after the rotation operation.

2. The illumination apparatus according to claim 1, wherein the first state is a state in which at least one of the light emitting unit and the optical member is at a closest position to a rotation axis of the movable unit within a movable range.

3. The illumination apparatus according to claim 1, wherein the first state is a state in which the light emitting unit has a narrowest illumination range.

4. The illumination apparatus according to claim 1, wherein the control unit performs control so that the second moving operation is performed according to an illumination direction of the light emitting unit after the rotation operation is performed.

5. The illumination apparatus according to claim 1, further comprising:
   a capacitor configured to accumulate electrical energy used for the light emitting unit emitting light, wherein power is supplied to the capacitor from the power source that supplies power to the first driving unit and the second driving unit; and a charging control unit configured to limit charging of the capacitor when the rotation operation is performed.

6. The illumination apparatus according to claim 5, wherein, if the rotation operation is performed during the charging of the capacitor, the charging control unit stops the charging of the capacitor.

7. The illumination apparatus according to claim 1, wherein, if the rotation operation is performed to determine an illumination direction of the light emitting unit, the control unit performs control so that the rotation operation is performed after the moving operation is performed.

8. An illumination apparatus comprising:
a main body;
a movable unit configured to be rotatable with respect to the main body, the movable unit including a light source and an illumination range changing unit configured to change an illumination range of light from the light source;
a first driving unit configured to rotate the movable unit with respect to the main body;
a second driving unit configured to move an element included in the illumination range changing unit to change the illumination range of light from the light source, wherein power is supplied to the second driving unit from a power source that supplies power to the first driving unit; and
a control unit configured to control a rotation operation performed using the first driving unit and a moving operation performed using the second driving unit,
wherein, in a case that the rotation operation and the moving operation are performed, the control unit performs control so that the rotation operation is performed after a first moving operation is performed to bring a position of the element to a first position and a second moving operation is performed to bring the position of the element to a second position which is different from the first position after the rotation operation.

9. A method for controlling an illumination apparatus having a main body and a movable unit, wherein the movable unit is configured to be rotatable with respect to the main body and includes a light emitting unit and an optical member disposed in front of the light emitting unit to refract incident light, the method comprising:
rotating, as first driving, the movable unit with respect to the main body;
moving, as second driving, at least one of the light emitting unit and the optical member to change relative positions of the light emitting unit and the optical member, wherein power is supplied in the second driving from a power source that supplies power in the first driving; and
controlling a rotation operation performed using the first driving and a moving operation performed using the second driving,
wherein, in a case that the rotation operation and the moving operation are performed, controlling includes performing control so that the rotation operation is performed after a first moving operation is performed to bring relative positions of the light emitting unit and the optical member to a first state and a second moving operation is performed to bring the relative positions of the light emitting unit and the optical member to a second state which is different from the first state after the rotation operation.

10. A method for controlling an illumination apparatus having a main body and a movable unit, wherein the movable unit is configured to be rotatable with respect to the main body, the movable unit including a light source and an illumination range changing unit configured to change an illumination range of light from the light source, the method comprising:
rotating, as first driving, the movable unit with respect to the main body;
moving, as second driving, an element included in the illumination range changing unit to change the illumination range of light from the light source, wherein power is supplied in the second driving from a power source that supplies power in the first driving; and
controlling a rotation operation performed using the first driving and a moving operation performed using the second driving,
wherein, in a case that the rotation operation and the moving operation are performed, controlling includes performing control so that the rotation operation is performed after a first moving operation is performed to bring a position of the element to a first position and a second moving operation is performed to bring the position of the element to a second position which is different from the first position after the rotation operation.

11. An imaging apparatus capable of imaging with an illumination apparatus, wherein the illumination apparatus includes a main body, a movable unit configured to be rotatable with respect to the main body, the movable unit including a light emitting unit and an optical member disposed in front of the light emitting unit to refract incident light, a first driving unit configured to rotate the movable unit with respect to the main body, and a second driving unit configured to move at least one of the light emitting unit and the optical member to change relative positions of the light emitting unit and the optical member, wherein power is supplied to the second driving unit from a power source that supplies power to the first driving unit, the imaging apparatus comprising:
a control unit configured to control a rotation operation performed using the first driving unit and a moving operation performed using the second driving unit,
wherein, in a case that the rotation operation and the moving operation are performed, the control unit performs control so that the rotation operation is performed after a first moving operation is performed to bring relative positions of the light emitting unit and the optical member to a first state and a second moving operation is performed to bring the relative positions of the light emitting unit and the optical member to a second state which is different from the first state after the rotation operation.

12. An imaging apparatus capable of imaging with an illumination apparatus, wherein the illumination apparatus includes a main body, a movable unit configured to be rotatable with respect to the main body, the movable unit including a light source and an illumination range changing unit configured to change an illumination range of light from the light source, a first driving unit configured to rotate the movable unit with respect to the main body, and a second driving unit configured to move an element included in the illumination range changing unit to change the illumination range of light from the light source, wherein power is supplied to the second driving unit from a power source that supplies power to the first driving unit, the imaging apparatus comprising:
a control unit configured to control a rotation operation performed using the first driving unit and a moving operation performed using the second driving unit, wherein, in a case that the rotation operation and the moving operation are performed, the control unit performs control so that the rotation operation is performed after a first moving operation is performed to bring a position of the element to a first position and a second moving operation is performed to bring the position of the element to a second position which is different from the first position after the rotation operation.

13. A camera system including an illumination apparatus and an imaging apparatus, the camera system comprising:

a main body;

a movable unit configured to be rotatable with respect to the main body, the movable unit including a light emitting unit and an optical member disposed in front of the light emitting unit to refract incident light;

a first driving unit configured to rotate the movable unit with respect to the main body;

a second driving unit configured to move at least one of the light emitting unit and the optical member to change relative positions of the light emitting unit and the optical member, wherein power is supplied to the second driving unit from a power source that supplies power to the first driving unit; and a control unit configured to control a rotation operation performed using the first driving unit and a moving operation performed using the second driving unit, wherein, in a case that the rotation operation and the moving operation are performed, the control unit performs control so that the rotation operation is performed after a first moving operation is performed to bring relative positions of the light emitting unit and the optical member to a first state and a second moving operation is performed to bring the relative positions of the light emitting unit and the optical member to a second state which is different from the first state after the rotation operation.

14. A camera system including an illumination apparatus and an imaging apparatus, the camera system comprising:

a main body;

a movable unit configured to be rotatable with respect to the main body, the movable unit including a light source and an illumination range changing unit configured to change an illumination range of light from the light source;

a first driving unit configured to rotate the movable unit with respect to the main body;

a second driving unit configured to move an element included in the illumination range changing unit to change the illumination range of light from the light source, wherein power is supplied to the second driving unit from a power source that supplies power to the first driving unit; and a control unit configured to control a rotation operation performed using the first driving unit and a moving operation performed using the second driving unit, wherein, in a case that the rotation operation and the moving operation are performed, the control unit performs control so that the rotation operation is performed after a first moving operation is performed to bring a position of the element to a first position and a second moving operation is performed to bring the position of the element to a second position which is different from the first position after the rotation operation.

* * * * *